United States Patent [19]
Yamaguchi et al.

[11] 3,904,568

[45] Sept. 9, 1975

[54] METHOD FOR GRAFTING ORGANIC POLYMERS ONTO INORGANIC COLLOIDAL MATERIAL

[75] Inventors: Tadashi Yamaguchi, Sendai; Hiroshi Hoshi, Narashino; Michio Hirakawa; Isao Watanabe, both of Ichikawa, all of Japan

[73] Assignee: Lion Yushi Kabushiki Kaisha, Tokyo, Japan

[22] Filed: Feb. 23, 1973

[21] Appl. No.: 335,228

[30] Foreign Application Priority Data
Feb. 24, 1972   Japan.............................. 47-19533

[52] U.S. Cl....260/29.6 M; 106/308 M; 260/29.6 R; 260/29.6 AN; 260/29.6 H; 260/29.6 Z; 260/29.6 MM; 260/29.6 MQ; 260/29.7 R; 260/29.7 M; 260/29.7 SQ; 260/42.14; 260/42.16; 260/42.53
[51] Int. Cl........................ C08f 45/04; C08f 45/24
[58] Field of Search......... 260/41, 29.6 R, 29.6 AN, 260/29.6 M, 29.6 H, 29.6 Z, 29.6 MM, 29.6 MQ, 29.7 R, 29.7 M, 29.7 SQ, 42.14, 42.16.42.53; 106/308 M

[56] References Cited
UNITED STATES PATENTS

| | | | |
|---|---|---|---|
| 2,171,765 | 9/1939 | Rohm et al. ...................... | 260/41 R |
| 3,208,984 | 9/1965 | Pekking............................ | 260/41 A |
| 3,661,620 | 5/1972 | Pekking et al..................... | 260/41 A |
| 3,808,174 | 4/1974 | Yamaguchi....................... | 260/63 R |

OTHER PUBLICATIONS
Kargin et al., Polymerization and Grafting Processes on Freshly Formed Surfaces, In Journal of Polymer Science, Vol. 52, pages 155–157, 1961.

*Primary Examiner*—James H. Derrington
*Attorney, Agent, or Firm*—William J. Daniel

[57]  ABSTRACT

A method for grafting organic polymers onto inorganic colloidal substances by (1) forming a colloid of an inorganic compound in situ in a reaction medium containing a radical-polymerizable or -copolymerizable vinyl-type monomer or (2) causing a partial change in the colloidal state of previously obtained inorganic colloidal material in a reaction medium containing a vinyl-type monomer and products obtained by such method.

1 Claim, No Drawings

3,904,568

METHOD FOR GRAFTING ORGANIC POLYMERS ONTO INORGANIC COLLOIDAL MATERIAL

BACKGROUND OF THE INVENTION

1. Field of the Invention

This invention relates to an improved process for the production of composite materials comprising an inorganic substance and an organic polymer which are useful as molding materials or plastic fillers. More particularly, this invention relates to an improved process for the production of inorganic colloidal substances having an organic polymer grafted thereto.

2. Description of the Prior Art

Several methods have been proposed hitherto for grafting organic polymers such as polyvinyl chloride, poly(methyl acrylate), poly(methyl methacrylate) and polystyrene to a variety of metals and inorganic substances such as Fe, Ni, ZnO, $TiO_2$, $BaSO_4$, silica gel, quartz and carbon black. Representative of these are a mechanical activating method and a radiation polymerization method. As an example of the former, V. A. Kargin et al reported chemical grafting of organic polymers onto freshly-formed faces of metals and alkali metal salts by grinding or milling [Vysckomol, Soedin. 1, pp. 330–331 and 1713–1720 (1959)]. As an example of the latter, Tsetlin et al. reported in Akad. Nauk SSR, Otd. Khim. Nauk, Moscow, 1960, p. 497, that poly(methyl methacrylate), polyacrylonitrile and polyvinyl chloride were grafted to carbon black, powdered silica gel and MgO at 40°–50°C using $\beta$-radiation.

However, any method wherein the polymerization of an organic monomer is initiated by providing a new crystalline surface on an inorganic substance by a mechanical means such as pulverization in order to graft the organic polymer to the inorganic substance has low efficiency because of the difficulty in attaching a sufficient amount of the polymer to the inorganic substance on account of the limited number of active sites formed on the crystalline surface. Moreover, such methods are applicable only to crystalline inorganic substances. On the other hand, methods utilizing radiation polymerization are not suited for commercial practice since they require specialized apparatus and involve many dangerous operations. Thus, all of the methods known heretofore for grafting organic polymers onto inorganic substances have various disadvantages for commercial scale operation and are difficult to be put into practice.

BRIEF SUMMARY OF THE INVENTION

Accordingly, it is an object of this invention to provide an improved method for grafting organic polymers to inorganic substances, especially inorganic colloidal substances.

It is another object of this invention to provide a method for effectively grafting organic polymers to inorganic colloidal substances by a chemical treatment.

It is still another object of this invention to provide a method for grafting organic polymers to inorganic colloidal substances by using a new radical polymerization initiator system.

Other and further objects, features and advantages of the invention will appear more fully from the following descriptions.

DETAILED DESCRIPTION OF THE INVENTION

As indicated above, the object of the invention is to attach an organic polymer to an inorganic colloidal substance in a way referred to as "grafting." The term "grafting" as used herein means that the organic polymer is attached strongly to the inorganic colloidal substance and cannot easily be detached or removed by extraction with a solvent, in contrast to ordinary absorption or adhesion where the polymer is easily detachable by mere extraction with a solvent.

The term "radical-polymerizable or -copolymerizable $\alpha,\beta$-ethylenically unsaturated monomer" is used herein to mean monomers capable of undergoing chain or vinyl-type polymerization of copolymerization in the presence of a radical polymerization initiator.

According to one embodiment of this invention, two or more of the reactants adapted to form a colloid of an inorganic substance by mutual reaction are introduced into a radical-polymerizable or copolymerizable vinyl monomer or into a medium having the vinyl monomer dispersed thereinto, the medium being selected from water, aromatic hydrocarbons such as benzene, alcohols such as methanol, ketones such as acetone, halogenated hydrocarbons, such as chloroform and ethers, such as diethyl ether, whereby a colloid of an inorganic substance is formed in situ in the medium and graft polymerization of the vinyl monomer is initiated at the freshly formed surfaces of the colloid to permit the production of a composite material comprising an inorganic colloidal substance grafted with an organic polymer.

As a combination of reactants which can be used in the above embodiment to form an inorganic colloid by mutual reaction, there can be mentioned various combinations of reactants capable of forming inorganic gels, such as silica hydrogel and alumina hydrogel or inorganic colloidal substances such as hydroxides of aluminum, iron, cobalt, zinc, copper, chromium and nickel. More specifically, a combination of sodium silicate, calcium silicate, natural sand or blast furance slag (composition: $SiO_2$ 34.9%, $Fe_2O_3 + Al_2O_3$ 16.8%, CaO 41.1% and MgO 5.5%) with an acid such as sulfurous acid or sulfuric acid or a combination of aluminum sulfate, ferric sulfate, ferric chloride or cobalt chloride with an alkali such as sodium hydroxide or ammonia water can be mentioned as preferred examples. However, it is to be noted that combinations of reactants used in the method of this invention for forming a colloid of an inorganic substance are not limited to those specifically exemplified herein.

According to another embodiment of this invention, a radical-polymerizable or -copolymerizable vinyl monomer or monomers and a previously prepared inorganic colloidal substance are brought together in a reaction medium and thereafter a partial change or alteration in the colloidal state of the inorganic colloidal substance is caused to occur. The phrase "a partial change in the colloidal state" is used herein to mean partial dissolution of the colloid or conversion of a portion of the colloid into a crystalline substance.

Partial dissolution of the colloid can be achieved by adding a small amount of an acid to a colloidal metal hydroxide, such as aluminum hydroxide or ferric hydroxide. On the other hand, a method for converting a colloid into a crystalline substance can be exemplified specifically, for example, by heating of calcium carbonate gel to vaterite type calcium carbonate.

Vinyl or $\alpha,\beta$-ethylenically unsaturated monomers utilizable in the method of this invention include, for example, unsaturated fatty acids, such as acrylic acid and methacrylic acid; salts of unsaturated fatty acids, such as sodium acrylate and potassium methacrylate; esters of unsaturated fatty acids, such as methyl acrylate, methyl methacrylate, ethyl acrylate and n-octyl methacrylate; vinyl esters of fatty acids, such as vinyl acetate, vinyl propionate, vinyl laurate and vinyl stearate; dienes, such as butadiene, isoprene and chloroprene; halogenated olefins, such as vinyl chloride and vinylidene chloride; styrenes, such as styrene itself, m-chlorostyrene and pentachlorostyrene; heterocyclic vinyl compounds, such as 2-vinylpyridine; and other vinyl compounds, such as vinyl isocyanate, acrylonitrile and methacrylonitrile.

In the practice of this invention, a combination of various factors including the type of monomer, the properties of the reaction medium at the time of adding the monomer, the type of inorganic colloidal substance and the way of forming the inorganic colloidal substance can freely be selected according to the nature and intended purpose of the end product to be formed and conventional chemical knowledge. In the method of this invention, the monomer can be used as such or dissolved in a solvent usually used for solution polymerization or dispersed into water by the aid of a dispersing liquid or emulsifier such as a surfactant, especially a non-ionic surfactant. An inorganic colloidal substance is then formed in the monomer-containing liquid thus prepared and then polymerization of the monomer is initiated. In this case, the concentration of the monomer in its solution or dispersion can suitably be varied according to the type of monomer and the method for forming the inorganic colloidal substance.

In the polymer obtained according to the method of this invention, the ratio by weight of the polymeric moiety derived from the monomer can freely be changed by controlling the amount of the starting materials.

For carrying out the method of this invention particularly advantageously, a combination of sulfur dioxide and water or an aqueous solution of sulfurous acid is used as one of the reactants for forming the colloid or for partially dissolving an existing colloid. Sulfur dioxide or sulfurous acid generates in the presence of water bisulfite ion ($HSO_3^-$) which, together with an inorganic colloidal substance or an inorganic substance utilizable for the formation of such colloidal substance, constitutes a radical polymerization initiating system and serves to initiate the polymerization reaction of the vinyl monomer or monomers. Thus, a graft polymerization reaction of the vinyl monomer or monomers onto the inorganic colloidal substance proceeds at a higher rate.

Polymers having a relatively large ratio by weight of the polymeric moiety derived from the monomer, for example more than about 10 wt.%, especially at least 50 wt.%, can be used in molding and also as a filler such as putty. On the other hand, polymers having a lower content of polymer, for example, less than several wt.%, cannot be used as such in molding but, when added as a filler to other synthetic resins, especially thermoplastic resins, these polymers will exhibit excellent results for filling because of their improved compatibility with the resins, especially if the resins are the same as the graft polymer.

PREFERRED EMBODIMENT OF THE INVENTION

To further illustrate this invention, but without limiting its scope, the following examples are given.

EXAMPLE 1

In a 200 ml flask are placed at 40°C under pressure 15.19 g of a blast furnace slag (composition: $SiO_2$ 34.9%, $Fe_2O_3$ + $Al_2O_3$ 16.8%, CaO 41.1% and MgO 5.5%). 80 Milliliters of water and 13.44 g of monomeric methyl methacrylate are then added to the slag to suspend it in the liquid.

Into the suspension is blown under agitation 8.32 g of gaseous sulfur dioxide for a period over 30 minutes and the mixture is then allowed to react for 4 hours at 40°C. Diethyl ether is added to the reaction mixture and the whole is subjected to centrifugal separation, washing with methanol and drying, whereupon 22.44 g of a solid material is obtained.

When 14.86 g of the solid material is extracted with benzene for 22 hours using a Soxhlet extractor, 0.42 g of homopolymer of methyl methacrylate is obtained as a benzene-soluble fraction. An X-ray diffraction analysis of a first benzene extraction residue shows the presence of a very slight amount of calcium sulfite. The first benzene extraction residue is then decomposed with 10% hydrochloric acid, washed with water and dried and the resulting dried material again extracted with benzene for 24 hours using a Soxhlet extractor whereby 0.33 g of a second benzene extract is obtained. An IR-absorption spectrum of the second benzene extract is identical with that of methyl methacrylate homopolymer. An X-ray diffraction analysis of the solid residue of the second benzene extraction does not show the presence of calcium sulfite. It is found that IR-absorption spectra of the second benzene extraction residue measures according to a total reflection absorption spectrum method includes a spectrum of poly(methyl methacrylate). An elementary analysis of the second benzene extraction residue shows that 1.17 g of poly(methyl methacrylate) is present in the residue.

These tests obviously show that the solid material is composed predominantly of an inorganic colloidal substance having a high molecular polymeric substance grafted thereto and contains a very slight amount of calcium sulfite. The residue of the first benzene extraction gives a molded product having a hardness of 4 (Mohs' scale) when compression molded at 250°C under pressure of 50 kg./cm².

EXAMPLE 2

In a 200 ml flask are placed 20.06 g of a product obtained by baking sand of about 50 mesh at 1000°C for 1 hour, neutralizing the resulting baked sand (CaO 37.1%) with an aqueous solution of sulfurous acid, and then filtering and drying the sand. 80.0 grams of water and 15.27 g of monomeric methyl methacrylate are then added and 4.04 g of gaseous sulfur dioxide is blown for a period over 30 minutes into the mixture with stirring at 40°C under normal pressure. After continuation of stirring for 20 hours, hydroquinone and ether are added to the reaction mixture and the solid material is separated by centrifugal separation. The separated phase is washed with methanol and dried to obtain 28.6 g of a solid product. Extraction of 13.885 g of the solid product with benzene using a Soxhlet extractor gives 3.696 g of a benzene-soluble fraction an IR-absorption spectrum of which is identical with that of poly(methyl methacrylate). An elementary analysis of a benzene extraction residue shows that 23.0% of the polymer is present in the residue. The benzene extraction residue is then decomposed with 10% hydrochloric acid, washed with water and methanol and dried and the resultant dried material again extracted with benzene for 24 hours using a Soxhlet extractor whereby 1.68 g of a benzene soluble fraction is obtained. An IR-absorption spectrum of the fraction is identical with that of methyl methacrylate homopolymer. An X-ray diffraction analysis of the solid residue of the second benzene extraction did not show the presence of calcium sulfite.

An elementary analysis of the second benzene extraction residue shows that 0.62 g of poly(methyl methacrylate) is contained in the residue. These results obviously show that the solid material obtained from the above reaction is an inorganic colloidal substance having a high molecular substance grafted thereto. The initial benzene extraction residue gives a very lustrous molded product having a hardness of 4 (Mohs' scale) and a bending strength of 315 kg./cm$^2$ when compression molded at 250°C under pressure of 10 kg./cm$^2$.

EXAMPLE 3

In a 200 ml flask are placed at 50°C under normal pressure 15.00 g of a copper smelting furnace slag (composition: SiO$_2$ 39%, FeO 30%, Al$_2$O$_3$ 9.1% and CaO + MgO 13.8%). 80 Milliliters of water and 13.25 g of methyl methacrylate are then added to the slag to suspend it in the liquid. Into the suspension is blown under agitation 8.51 g of gaseous sulfur dioxide for a period over 30 minutes and the mixture is then reacted for 6 hours at 50°C. Diethyl ether is added to the reaction mixture and the whole subjected to centrifugal separation, washing with methanol and drying whereupon 21.49 g of a solid material is obtained. When 15.00 g of the solid material is extracted with benzene for 24 hours using a Soxhlet extractor, 0.23 g of a homopolymer of methyl methacrylate is obtained as a benzene-soluble fraction. An X-ray diffraction analysis of the solid benzene extraction residue shows the presence of a very slight amount of calcium sulfite. The benzene extraction residue is then decomposed with 10% hydrochloric acid, washed with water and dried and the resulting dried material is again extracted with benzene for 24 hours using a soxhlet extractor whereby 0.42 g of a benzene extract is obtained. An IR-absorption spectrum of the second benzene extract is sub-substantially identical with that of the homopolymer of methyl methacrylate. An X-ray diffraction analysis of the second benzene extraction residue does not show the presence of calcium sulfite. An IR-absorption spectra of the second benzene extract measured according to a total reflection absorption spectrum method include a spectrum of poly(methyl methacrylate). An elementary analysis of the second benzene extraction residue shows that 0.96 g of poly(methyl methacrylate) is present in that residue. These results show that the solid reaction material contains a very slight amount of calcium sulfite and a predominant amount of an inorganic collodial substance having a high molecular substance grafted thereto. Both of the benzene extraction residues give molded products having a hardness of 4 (Mohs'scale) when compression molded at 250°C under pressure of 50 kg./cm$^2$.

EXAMPLE 4

In a reactor are placed 1000 g of an aqueous solution of Al$_2$(SO$_3$)$_3$ having an aluminum content of 4.03 g calculated as Al(OH)$_3$. To the solution is added at 55°C 2.8 g of ammonia water at a rate of 1.7 ml/min. When the solution becomes slightly turbid by the formation of a white precipitate, 10.1 g of methyl methacrylate are added to the solution. Then, 100 ml of 2.8% ammonia water is added dropwise to the solution in one hour thereby precipitating aluminum hydroxide gel. A pH value of the solution after one hour is 6.9. 10 Milliliters of methanol containing 1% hydroquinone are added and the mixture is immediately filtered to collect a residue which is then washed with water and methanol. An X-ray diffraction analysis of the residue does not show the presence of any crystalline substance. The residue is dried a full day and night at 140°C to obtain 48.8 g of a solid material which, by IR-absorption spectrum analysis, is found to contain aluminum hydroxide and poly(methyl methacrylate). When a part of the solid reaction product (5.00 g) is extracted with benzene for 24 hours using a Soxhlet extractor, 0.196 g of poly(-methyl methacrylate) is extracted. IR-absorption spectra of the benzene extraction residue is found to include the spectrum of benzene-insoluble poly(methyl methacrylate). An elementary analysis of the benzene extraction residue shows that 0.374 g of poly(methyl methacrylate) is contained in residue. The composition of the solid material was found as follows:

| | |
|---|---|
| Al(OH)$_3$ gel | 72.1% |
| Benzene-soluble poly(methyl methacrylate) | 3.9% |
| Benzene-insoluble poly(methyl methacrylate) | 7.5% |
| Absorbed water and other ingredients | 16.5% |

In view of the above results, it is evident that the product of this example is composed of an inorganic substance having a high molecular substance grafted thereto.

EXAMPLE 5

As in the case of Example 1, 15.6 g of a blast furnace slag (composition: SiO$_2$ 34.9%, Fe$_2$O$_3$ + Al$_2$O$_3$ 16.8%, CaO 41.1% and MgO 55%) is placed at 40°C under normal pressure in a 200 ml flask. 80 Milliliters of water and 10.53 g of monomeric methyl acrylate is then added to the slag to suspend it in the liquid. To the suspension is added under agitation 30 ml of a 2.1-N aqueous solution of sulfurous acid and the mixture is reacted for 4.5 hours. Diethyl ether is added to the reaction mixture and the whole is subjected to centrifugal separation, washing with methanol and drying whereupon 22.58 g of a solid material is obtained.

When 10.16 g of the solid material is extracted with benzene for 24 hours using a Soxhlet extractor, 2.80 g of homopolymer of methyl acrylate is obtained as a benzene-soluble fraction. An X-ray diffraction analysis of a benzene extraction residue shows the presence of a very slight amount of calcium sulfite. The benzene extraction residue is then decomposed with 10% hydrochloric acid, washed with water and dried and the resulting dried material again extracted with benzene for 24 hours using a Soxhlet extractor whereby 0.41 g of a benzene extract is obtained. An IR-absorption spectrum of the benzene extract is identical with that of methyl acrylate homopolymer. X-ray diffraction analysis of a second benzene extraction residue does not show the presence of calcium sulfite. IR-absorption spectra of the second benzene extraction residue measured according to a total reflection absorption spectrum method is formed to include a spectrum for poly(-methyl acrylate). An elementary analysis of the second benzene extraction residue shows that 0.71 g of poly(methyl acrylate) is present in the residue.

These results show that solid material obtained by this example is composed of a very slight amount of calcium sulfite and a predominant amount of an inorganic colloidal substance having a high molecular substance grafted thereto. The initial benzene extraction residue gives a molded product having a hardness of 4 (Mohs' scale) when compression molded at 250°C under pressure of 50 kg./cm$^2$.

EXAMPLE 6

As in the case of Example 3, 15.13 g of a copper smelting furnace slag (composition: $SiO_2$ 39%, FeO 30%, $Al_2O_3$ 9.1% and CaO + MgO 13.8%) are placed at 50°C under normal pressure in a 200 ml flask. 80 Milliliters of water and 10.21 g of monomeric styrene are added to the slag to suspend it in the liquid. Into the suspension is blown under agitation 5.05 g of gaseous sulfur dioxide for a period over 30 minutes and the mixture is then reacted for 6 hours at 50°C. Diethyl ether is added to the reaction mixture and the whole is subjected to centrifugal separation, washing with methanol and drying whereupon 16.55 g of a solid material is obtained. When 14.23 g of the solid material is extracted with benzene for 24 hours using a Soxhlet extractor, 0.82 g of a benzene-soluble fraction is obtained which is a homopolymer of styrene. An X-ray diffraction analysis of a benzene extraction residue shows the presence of a very slight amount of calcium sulfite. The benzene extraction residue is then decomposed by 10% hydrochloric acid, washed with water and dried and the resulting dried material again extracted with benzene for 24 hours using a Soxhlet extractor whereby 0.33 g of a benzene soluble fraction is obtained. An IR-absorption spectrum of the fraction is identical with that of styrene homopolymer. An X-ray diffraction analysis of the residue of the second benzene extraction does not show the presence of calcium sulfite. IR-absorption spectra of the second benzene extraction residue measured by a total reflection absorption spectrum method includes the spectrum of polystyrene. An elementary analysis of the second benzene extraction residue shows that 0.72 g of polystyrene is present in that residue. These results show that the initial solid material is composed of a very slight amount of calcium sulfite and a predominant amount of an inorganic colloidal substance having a high molecular substance grafted thereto. Both of the benzene extraction residues give molded products having a hardness of 4 (Mohs' scale) when compression molded at 250°C under pressure of 50 kg./cm$^2$.

EXAMPLE 7

A 2-liter three-necked flask is partially immersed in a constant temperature bath maintained at 50°C and a mixture of 29.8 g of aluminum hydroxide and 1 liter of water is placed in the flask. 30 Grams of methyl methacrylate are then added and the mixture is vigorously stirred. The temperature of the mixture is kept at 50°C and 0.5 g of gaseous sulfur dioxide is introduced thereinto for a period over 3 hours. After completion of introduction of sulfur dioxide, the mixture is reacted for an additional 3 hours. The reaction mixture is filtered and the filtration residue is washed with water adjusted to pH 4.5 by the addition of hydrochloric acid, and then dried in vacuo at 100°C. A product composed of 29.4 g of aluminum hydroxide, 21.2 g of poly(methyl methacrylate) and 26.1 g of water is thus obtained.

When a portion of the composition (10.00 g) is extracted with acetone for 24 hours using a Soxhlet extractor, 1.82 g of poly (methyl methacrylate) is extracted. The extraction residue is again dried in vacuo at 100°C and subjected to chemical analysis whereby the residue is found to contain 3.83 g of aluminum hydroxide and 0.94 g of poly(methyl methacrylate).

EXAMPLE 8

200 Milliliters of an aqueous solution of 22.2 g of calcium chloride and 200 ml of an ammonia-alkaline aqueous solution of 22.8 g of ammonium carbonate $(NH_4)_2CO_3.H_2O$ are respectively cooled 15°C. These solutions are mixed under vigorous agitation to form calcium carbonate gel. 6.0 Grams of monomeric ethyl methacrylate are then added and the mixture is heated under continuous agitation up to 45°C for 2 hours whereby the calcium carbonate gel is changed to vaterite type calcium carbonate. The mixture is then filtered and the filtration residue washed thoroughly with water and dried at 100°C under reduced pressure to obtain 20.3 g of a solid material.

When 10.0 g of the solid material is extracted with acetone for 24 hours using a Soxhlet extractor, 0.04 g of poly(methyl methacrylate) dissolved in acetone is recovered from the solid material. When the extraction residue is slowly dissolved in 10% hydrochloric acid, a portion of the residue amounting to 0.11 g remains undissolved. In view of this behavior, the solid product of this example is believed to be vaterite type calcium carbonate having poly(methyl methacrylate) grafted thereto.

What is claimed is:

1. A method of grafting an organic polymer onto an inorganic material which comprises forming a suspension of a blast furnace slag and at least one polymerizable α,β-ethylenically unsaturated monomer in an aqueous medium; introducing into said suspension sulfurous acid or sulfur dioxide to form a colloid by mutual reaction with said bast furnace slag and initiate polymerization of said monomer, and retaining said silicate and monomer in said medium for a time sufficient for such monomer to undergo substantial polymerization.

* * * * *